United States Patent [19]
Ando et al.

[11] Patent Number: 5,220,553
[45] Date of Patent: Jun. 15, 1993

[54] OPTICAL HEAD

[75] Inventors: Hideo Ando; Yuichi Nakamura, both of Tokyo, Japan

[73] Assignee: Kabushiki Kaisha Toshiba, Kawasaki, Japan

[21] Appl. No.: 707,024

[22] Filed: May 29, 1991

[30] Foreign Application Priority Data

May 30, 1990 [JP] Japan .................. 2-138546

[51] Int. Cl.$^5$ ............................................. G11B 11/00
[52] U.S. Cl. .................................. 369/112; 369/44.23; 359/837
[58] Field of Search ............ 369/112, 116, 100, 44.23; 359/833, 831, 837, 638, 640

[56] References Cited

U.S. PATENT DOCUMENTS

| 4,725,725 | 2/1988 | Ando ................................. 369/112 |
| 4,841,510 | 6/1989 | Yoshizawa ......................... 369/44.23 |
| 4,973,836 | 11/1990 | Matsuoka .......................... 369/44.23 |
| 5,105,410 | 4/1992 | Maeda et al. ..................... 369/44.23 |

FOREIGN PATENT DOCUMENTS 1-196742  8/1989  Japan .
1-287830  11/1989  Japan .

Primary Examiner—Paul M. Dzierzynski
Assistant Examiner—Drew A. Dunn
Attorney, Agent, or Firm—Finnegan, Henderson, Farabow, Garrett & Dunner

[57] ABSTRACT

In an optical head, a light beam emitted from a semiconductor laser is collimated by a collimator lens and the collimated light beam is incident on a unitary structure of first and second refractive members. The first and second refractive member have first and second refractive coefficients, respectively and the first refractive coefficient is smaller than the second refractive coefficient. The light beam is refracted at an incident surface of the first refractive member, the light beam passing through the first refractive member is also refracted at an interface between the first and second refractive members and the light beam passing through the second refractive member is emerged from a exit surface of the second refractive member and is directed in a predetermined direction. When a wavelength of the light beam is varied, a refraction angle at the incident surface of the first refractive member is changed. However, a refraction angle at the inferace between the first and second refractive members is also so changed as to correct the refraction angle at the incident surface of the first refractive member so that the light beam from the exit surface of the second refractive member is guided in the predetermined direction.

11 Claims, 2 Drawing Sheets

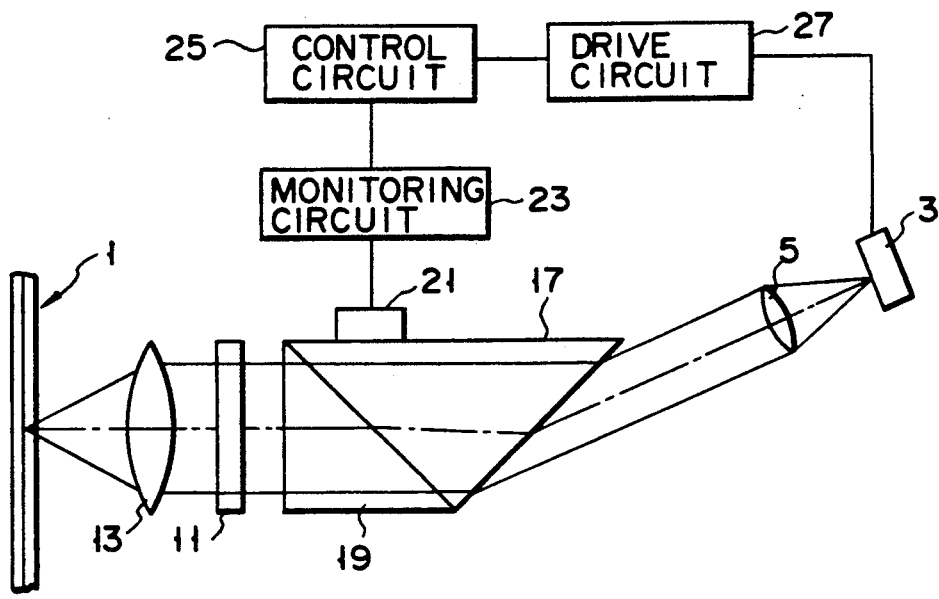
F I G. 3
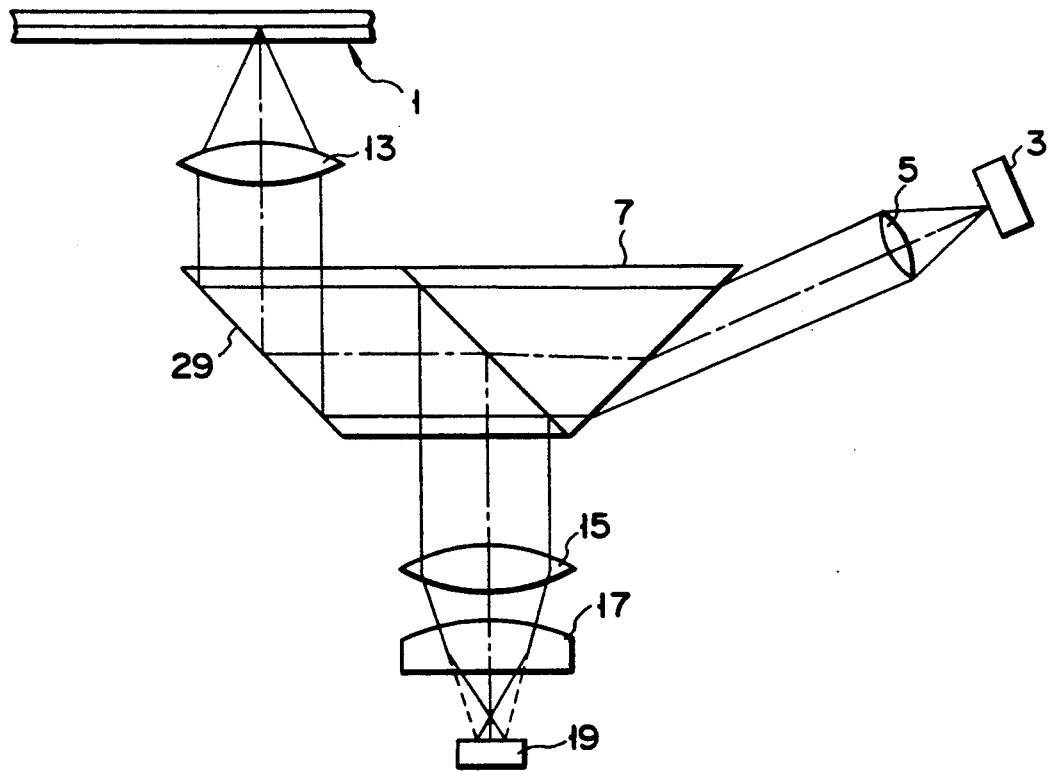
F I G. 4

OPTICAL HEAD

BACKGROUND OF THE INVENTION

1. Field of the Invention

This invention relates to an optical head for optical recording, playback or erasure of signals representing data on a recording medium. In particular, it relates to an optical head wherein errors caused by differences in wavelength of the light beam employed are corrected.

2. Description of the Related Art

In a prior art optical head, a light beam having an elliptical cross-section is generated from a semiconductor laser. This light beam is then collimated in a parallel beam by a collimator lens and is incident on an inclined surface of a prism so that a correction for ellipticity of the beam is performed utilizing the refractive index of the prism. In this optical system, since the prism is made of glass having a chromatic dispersion, if the wavelength of the light beam is varied or altered, the light beam is directed in a undesired direction in the prism. As a result, when the light beam is converged on the optical disk to form a beam spot, this beam spot can not formed at a proper and displaced from the proper position. If such displacement is large, it resulted in a focusing error or tracking error. Furthermore, it resulted in a reading error due to a differences in retrieved signal.

Recently, a multi mode semiconductor laser which is oscillated in a stable manner has come to be employed. However, such semiconductor laser is operated in multiple modes so that it emits a laser beam having a number of wavelengths. As a result, the laser beam cannot be acculetly focused on the optical disk so that a deformed spot having a relatively large width elongated in a direction is formed.

There has been proposed a conventional optical system which cancels the influence of chromatic dispersion. In the conventional optical head, a pair of anamorphic prisms are arranged between a collimator and a polarization beam splitter. The laser beam generated from a semiconductor laser is collimated into a parallel beam by collimator lens, and the elliptical shape of the beam is converted into a circular shape by the anamorphic prisms. This circular beam is then directed to object lens through polarization beam splitter and a quarterwave plate.

The laser beam is converged by object lens and reflected from a recording surface of optical disk. The reflected laser beam is returned to the object lens and is guided to the polarization beam splitter through the quarter-wave plate. The laser beam is reflected by polarization beam splitter and is converged on a photodetector having four divided photosensitive sections by a converging lens and a cylindrical lens. Astigmatism is applied to the laser beam by the cylindrical lens so that the shape of the beam spot on the photodetector is changed depending on the distance between the optical disk surface and the objective lens. Thus, a focusing error of the objective lens is detected by the photodetector and objective lens is moved along its optical axis in response to electrical signals from the photodetector in such a manner that the shape of the beam spot becomes circular on the photodetector.

In an another conventional optical head, instead of the anamorphic prism, there are provided modified prisms joined each other to form a signal optical unit wherein the laser beam is emerged from the exit surface of the prism at a fixed angle with the normal to the exit surface.

In the conventional optical head described above, so-called chromatic correction is performed by addition of the anamorphic prisms. Thus, a relatively large is required number of components and size of the optical head can not be decreased. There is also required that the optical axes of these relatively larger number of components are aligned. Accordingly, in the conventional optical head, there is a problem that its cost can not be improved.

SUMMARY OF THE INVENTION

An object of the invention is to provide a small and inexpensive optical head having a simple arrangement, wherein chromatic dispersion does not occur even through a semiconductor laser of the multi-mode type, or semiconductor lasers which generate different wavelengths are employed.

According to the invention, there is provided an optical head for optically retrieving information from an optical memory, comprising: means for generating a light beam: first refractive member for allowing the light beam to pass therethrough, having a first dispersion coefficient and provided with first and second surfaces, the light beam from the generating means being incident on the first surface and being emerged from the second surface; second refractive member for allowing the light beam from the first refractive member to pass therethrough, having a second dispersion coefficient different from the first dispersion coefficient and provided with first and second surfaces, the light beam from the first member being incident on the first surface and being emerged from the second surface; and means for converging the light beam from the second member onto the optical memory.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 and FIG. 4 are views showing arrangements of other embodiments of the invention.

DETAILED DESCRIPTION OF THE PREFERRED EMBODIMENTS

Embodiments of this invention will be described with reference to the drawings.

Figure 1:
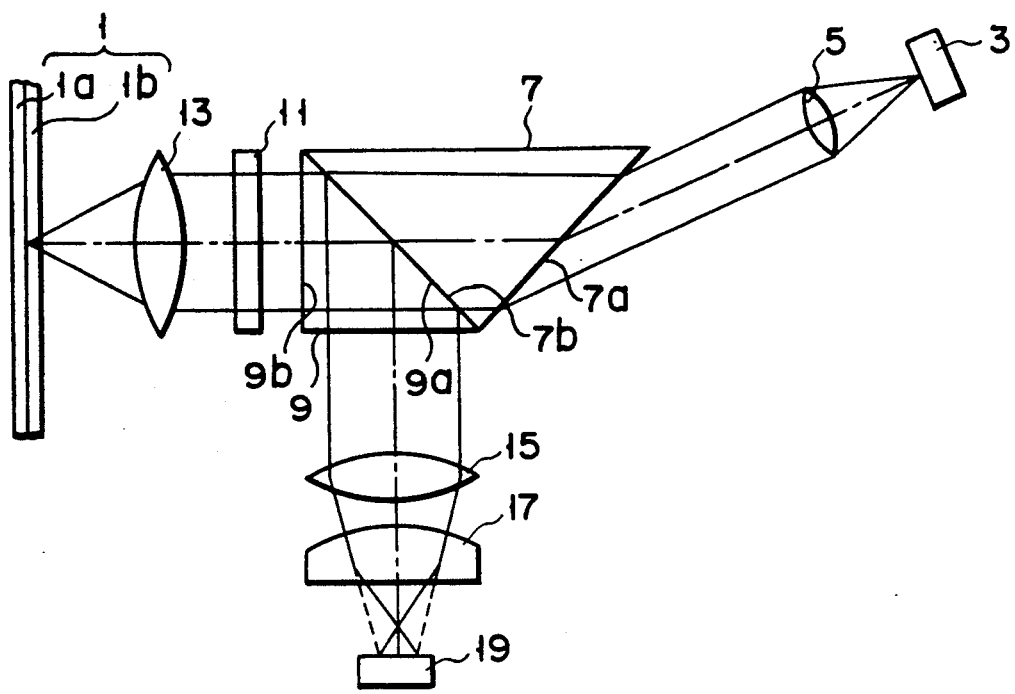
FIG. 1 is a view showing an optical arrangement of an optical head according to on embodiment of this invention.

FIG. 1 is a view showing an optical arrangement of an optical head according to one embodiment of the invention.

An optical disk 1 constituting a recording medium is for example a phase transformation type optical disk on which data can be overwritten. The optical disk 1 has a recording layer 1a on which the data signal is recorded and a disk substrate 1b made of a transparent material such as glass or polycarbonate or PMMA (transparent acrylic resin). Tracks, usually of 1.6 μm separation and formed concentrically or in spiral fashion are formed on the recording layer 1a formed on one side face of disk substrate 1b. The signal is formed as pits on these tracks.

In the optical head 1, a light beam is emitted to the optical disk 1 from a semiconductor laser 3 which is located under the optical disk 1. The optical disk 1 is rotated at high speed with for example a constant linear velocity by a spindle motor (not shown). Signal recording and erasure are performed on optical disk 1 by means of the beam. Reading or retrieving of the signal recorded on optical disk 1 is performed by receiving the light beam reflected from optical disk 1. During retrieving mode, the semiconductor laser emit a retrieving laser beam having a first fixed intensity and during a erasing mode, the semiconductor laser also emits a erasing laser beam having a second fixed intensity larger than the first intensity, while during recording mode, the semiconductor laser outputs a recording laser beam that is amplitude modulated in accordance with the recording signal.

The optical head is constructed so that it can be freely moved in the tracking direction by means of a linear motor (not shown). Also, the objective lens 13 can be accurately driven in response to a tracking error signal in a radial direction of the optical disk 1 by means of a tracking servomechanism (not shown). By this means, accessing of the track of a target address, and following eccentricity of the optical disk 1 can be performed reliably and precisely.

Also, the objective lens 13 is moved along its optical axis in response to a focusing signal so that a focusing operation for correcting a surface vibration of optical disk 1, which is usually within the range of a few hundred μm, can be precisely carried out by means of a focusing servomechanism (not shown).

In the optical shown in FIG. 1, the semiconductor laser 3 generates a laser beam having a wavelength which is set at for example 830 nm. The laser light diverged from the semiconductor laser 3 is directed to collimator lens 5 and is collimated into parallel light beam by the collimator lens 5. The collimated light beam is incident on a first optical member 7 preperforming an elliptical/circular correction. In the member 7, the shape of the laser beam in cross-section normal to the optic axis is corrected from elliptical to circular. Thus, the corrected laser beam is guided to a second optical member 9.

The first optical member 7 and second optical member 9 are right-angled prisms whose cross-sections are right-angled isosceles triangles. They are constituted as a unit by sticking them together such that the lengths of one inclined side of first optical member 7 and the bottom side of second optical member 9 are practically equal with said inclined side and bottom side facing each other. The collimated laser beam from collimator lens 5 is incident on the bottom side of first face 7a of the first optical member 7 and passes through the interface between first optical member 7 and a second optical member 9 i.e. the junction face of second face 7b and third face 9a. The laser beam is emerged from said fourth side 9b of second optical member 9 and is guided in the direction of the normal to this fourth side 9b. Thus, the laser beam is incident on a quarter wave plate 11.

Object lens 13 is equipped with an object lens actuator (not shown) which maintain the object lens 13 in a focusing state. In the focusing state, the laser beam is focused on the recording layer 1a to perform recording, playback or erasure of recording layer 1a.

The laser beam reflected from the recording layer 1a passes through the object lens 13 and the quarterwave plate 11 and is guided to the interface between the first and second members 7 and 9. The laser beam is reflected at the interface and is directed in the detection optical system including a detection lens 15, a cylindrical lens 17 and a photodetector 19.

Figure 2:
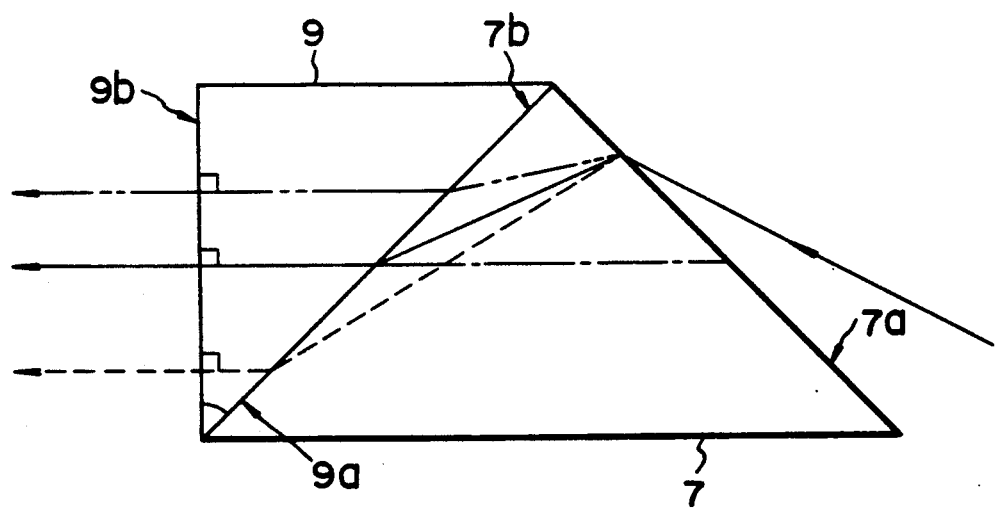
FIG. 2 is a view given in explanation of the principles of this invention.

The principles of this invention will now be described in detail with reference to FIG. 2.

The material of first optical member has a comparatively small dispersion coefficient and comparatively large Abbe number. For example, LF glass, LLF glass, BaF glass, LaSK glass, LaK glass, SSK glass, SK glass, BaLF glass, KF glass, K glass, BaK glass, SK glass, PSK glass, PK glass, BK glass, FK glass etc, which have an Abbe number of 45 or more are preferred.

The material of second optical member 9 has a large dispersion coefficient and small Abbe number. For example, the material which have an Abbe number of less than 55, such as SSK glass, BaLF glass, KF glass, LLF glass, BaF glass, LF glass, F glass, BaSF glass, SF glass, LaF glass, LaSF glass etc, are preferable.

Thus, first optical member 7 and second optical member 9 have different refractive indices and dispersion (Abbe number) with the dispersion of the second optical member 9 being larger, while its Abbe number is the smaller.

In this first and second optical members 7 and 9 the laser beam enters first face 7a of optical member 7 from an inclined direction and is emerged from fourth face 9b at an angle which is approximately parallel to the normal of this fourth face 9b of second optical member 9. Thus, the laser beam passing through the first optical member 7a is incident on the third surface at the incident angle of 45°. Also, the angle between the laser beam reflected from the optical disk 1 and incident on the third face 9a and the laser beam reflected from the third face 9a and directed towards the detection system is maintained at practically 90°.

This relationship is maintained even when the wavelength of the laser beam is changed. Specifically, if the wavelength is shorter than the wavelength of the laser beam shown by the solid line, the beam follows the path indicated by the dotted line, as shown in FIG. 2. If its wavelength is longer than the wavelength of the laser beam indicated by the solid line, the beam follows the path indicated by the double-dotted chain line. In both cases, the resulting beam is projected on to the object lens 13 maintaining parallelism with the original laser beam indicated by the solid line. The beam is therefore still focused on to the optical disk as a spot of small diameter.

That is, if the refractive index in the first optical member 7 increases, the resulting increase in angle of refraction at the first face 7a is cancelled by the change in angle of refraction at the interface between the second face 7b and the third face 9a. As a result, there is no change in angle when the beam passes through the fourth face 9b.

Also, the optical characteristic surface of the second face 7b and the third face 9a could be a polarization beam splitter surface as shown in FIG. 1, a non-polarization beam splitter surface as shown in FIG. 3, to be described, or a half mirror surface as shown in FIG. 4. There is no restriction in this respect. Specifically, it suffices if this face is an optical characteristic surface having a specific optical transmittance and optical reflectivity for the specified wavelength of the laser light.

Another embodiments of the invention will now be described with reference to FIGS. 3 and 4.

In an optical head shown in FIG. 3, the laser beam emitted from the semiconductor laser 3 is maintained to have a constant intensity. That is, a part of the laser beam emitted from the semiconductor laser 3 is reflected from the interface between the first and second optical members 12, 14 to a photodetector 19 and a electrical signal from the photodetector 19 is supplied to a monitor circuit 23 and is amplified and converted in a monitoring voltage signal in the monitor circuit 23. The monitoring signal is compared with a reference level in a control circuit 25 and the control signal is supplied to a drive circuit 27. The drive circuit 27 generates a drive current having a level which is varied in accordance with the control signal and the semiconductor laser 3 is driven by the drive current so that the intensity of the laser beam emitted from the semiconductor laser 3 is maintained at a constant level. In this optical system provided with the intensity control system, the interface between the first and second members 12 and 14 is formed as a non-polarization beam splitter surface.

In an optical head shown in FIG. 4, a second optical member 29 corresponding to the second optical member 19 has a total reflection surface. Thus, the light beam emerged from the interface between the first and second members 7, 29 is reflected and guided to the optical disk 1 by the total reflection surface of the member 29 and the light beam from the optical disk 1 is also reflected and guided to the interface by the total reflection surface of the second member 29. In this optical system, the optical members can be arranged in a relatively compact space.

As described above, with these embodiments, even if the wavelength of the laser light changes with fluctuation of the optical output of the semiconductor laser, there is no displacement of the position of the spot on the optical disk. Also, the spot can always be focused on to the optical disk even if a multi-mode semiconductor laser is employed. Furthermore, since it is unnecessary to add special optical members such as anamorphic prism pairs the optical system as a whole can be made of small size and of simple construction. The time required for complicated adjustments etc. is therefore eliminated. Thus, an optical head can be provided whereby very stable color correction can be achieved.

As described above, with an optical head according to this invention, chromatic correction can be performed without adding optical members, so a light beam can be generated which has a satisfactorily small focal spot diameter.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An optical head for optically retrieving information from an optical memory, comprising:
    means for generating a light beam having an elliptical cross-section;
    first refractive member for allowing the light beam to pass therethrough, having a first dispersion coefficient and provided with first and second surfaces, the light beam from the generating means being incident on the first surface at an inclined angle so that the light beam is changed to a light beam having a circular cross-section and the light beam having the circular cross-section being emerged from the second surface;
    second refractive member for allowing the light beam having the circular cross-section emerged from the first refractive member to pass therethrough, said second member having a second dispersion coefficient different from the first dispersion coefficient and provided with third and fourth surfaces, the light beam having the circular cross-section emerged from the first member being incident on the third surface and being emerged from the fourth surface; and
    means for converging the light beam emerged form the second member onto the optical memory.

2. An optical head according to claim 1, wherein the second surface of the first member is contacted to the third surface of the second member so that the first and second members are formed in a unitary structure.

3. An optical head according to claim 1, wherein the first member has a first Abbe number and the second member has a second Abbe number different from the first Abbe number.

4. An optical head according to claim 1, wherein the first dispersion coefficient is smaller than the second dispersion coefficient.

5. An optical head according to claim 3, wherein the first Abbe number is larger than the second Abbe number.

6. An optical head according to claim 5, wherein the first Abbe number is not smaller than 45.

7. An optical head according to claim 5, wherein the second Abbe number is not larger than 55.

8. An optical head according to claim 1, further comprising a polarization layer formed on one of the second surface of the first member and the third surface of the second member.

9. An optical head according to claim 1, further comprising a non-polarization layer formed on one of the second surface of the first member and the third surface of the second member.

10. An optical head for optically retrieving information from an optical memory, comprising:
    means for generating a light beam having an elliptical cross-section;
    means for detecting light beam having a circular cross-section reflected from said optical memory to retrieve information; and
    means, which includes a first refractive member having a first refractive coefficient, a beam splitting layer provided on the first refractive member, and a second refractive member coupled to the first refractive member through the beam splitting member and having a second refractive coefficient different from the first refractive coefficient, the first refractive member provided with an incident surface on which the light beam having the elliptical cross-section is incident at an inclined angle so that the light beam is changed to one having a circular cross-section for allowing the light beam from said generating means to pass through the beam splitting layer and for allowing the light beam with the circular cross-section reflected from said optical memory to reflect at the beam splitting layer to said detecting means.

11. An optical head according to claim 10, wherein the beam splitting layer includes one of a polarization layer, a non-polarization layer and a half mirror layer.

* * * * *